United States Patent
Leonard

[11] Patent Number: 6,070,365
[45] Date of Patent: Jun. 6, 2000

[54] MULTIPLE DOME SINGLE-PANEL EXPLOSION VENT

[75] Inventor: Brent W. Leonard, Kansas City, Mo.

[73] Assignee: Fike Corporation, Blue Springs, Mo.

[21] Appl. No.: 09/008,667

[22] Filed: Jan. 16, 1998

[51] Int. Cl.[7] .................................................... E04H 9/00
[52] U.S. Cl. ................................... 52/1; 52/2.11; 52/98
[58] Field of Search ............................... 52/1, 98, 2.11, 52/217, 2.25; 220/89.1

[56] References Cited

U.S. PATENT DOCUMENTS

| | | | |
|---|---|---|---|
| 4,067,154 | 1/1978 | Fike | 52/99 |
| 4,787,180 | 11/1988 | Robinson | 52/1 |
| 4,819,823 | 4/1989 | Kadakia et al. . | |
| 4,821,909 | 4/1989 | Hibler | 52/98 |
| 5,036,632 | 8/1991 | Short, III et al. . | |

*Primary Examiner*—Beth A. Aubrey
*Attorney, Agent, or Firm*—Hovey, Williams, Timmons & Collins

[57] ABSTRACT

An explosion vent (10) for covering an opening (12) in an enclosure (14) subject to the build-up of pressure is disclosed. The explosion vent includes a peripheral flange (16) configured for attachment to the enclosure around the opening, a pressure relief panel (18) positioned within and hingedly connected to the flange, and a plurality of connectors or rupture tab assemblies (19) connecting the unhinged portion of the pressure relief panel to the flange. The connectors break when the enclosure is subjected to pressure build-up for permitting the panel to shift outwardly from the enclosure for uncovering the opening in the enclosure. Rivets (72) are provided for attaching the rupture tab assemblies (19) to the pressure relief panel (18) which function to provide additional panel support and minimize localized bending of the rupture tabs (21) forming a part of assemblies (19) when the explosion vent is subjected to vacuum conditions, but do not interfere with rupture of the tabs and opening of the panel at a relatively low burst pressure. The pressure relief panel has a plurality of domed sections (46,48,50,52) presenting at least one valley defining bridge (54,56,58) therebetween. The domed sections and bridges cooperate to stiffen the panel so that it more uniformly distributes force on the connectors, causing all of the connectors to break at approximately the same time so that the panel more consistently opens at a selected burst pressure level.

29 Claims, 4 Drawing Sheets

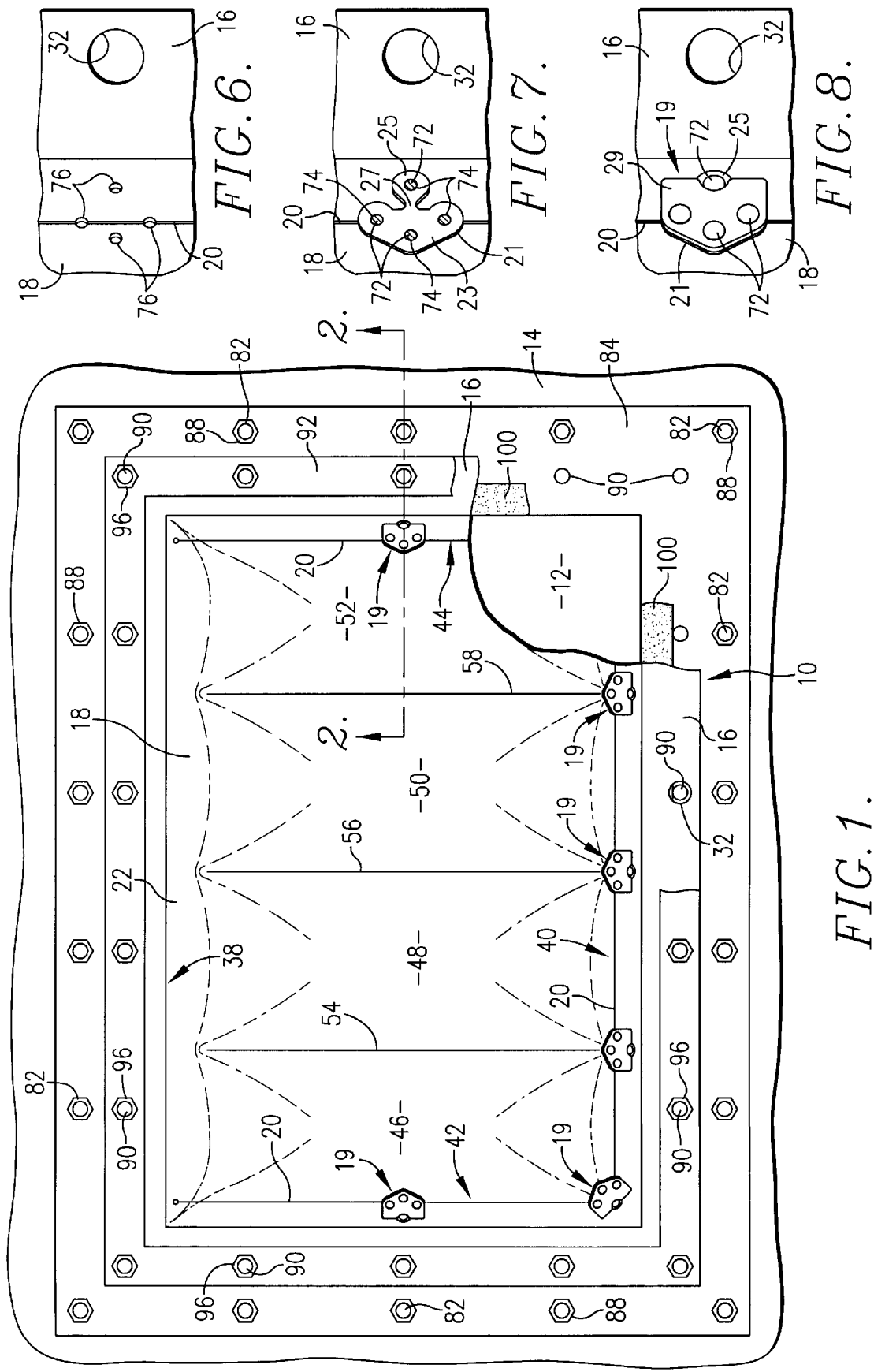

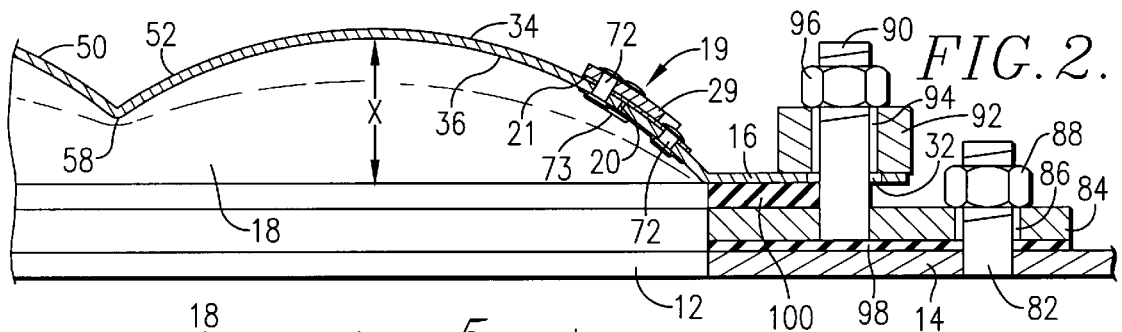
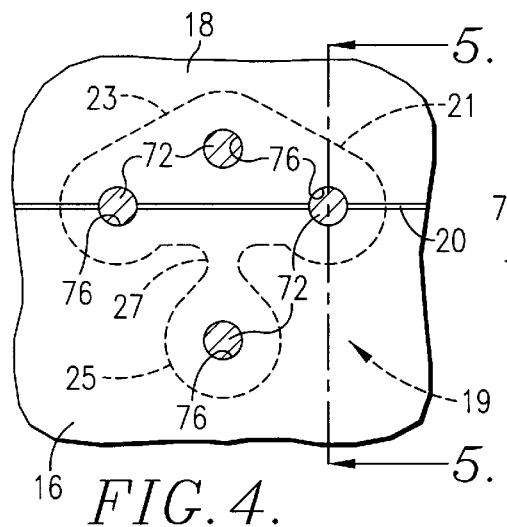
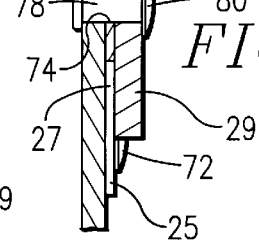
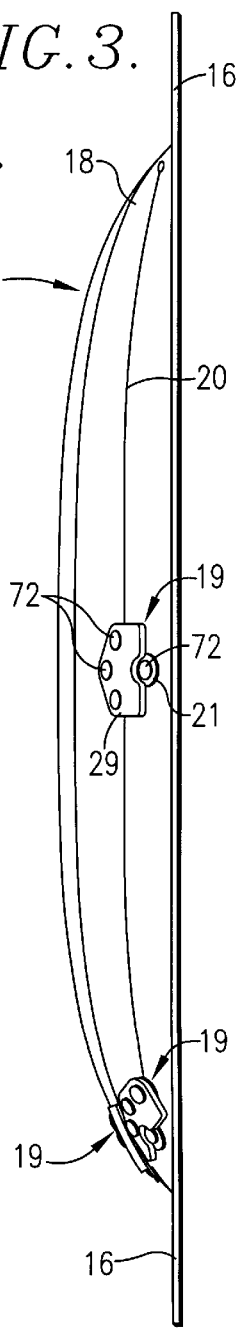
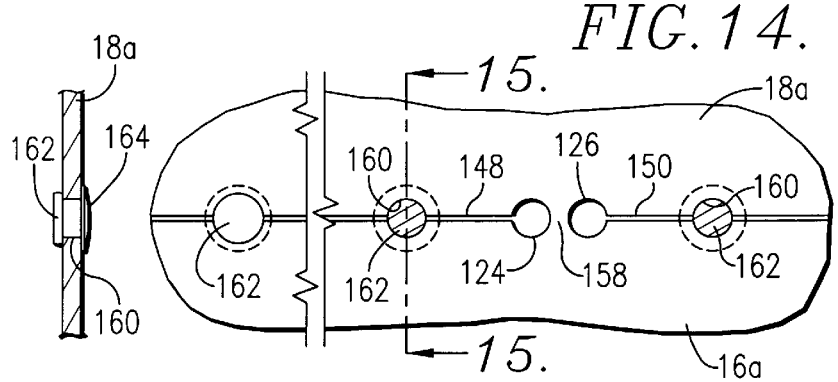
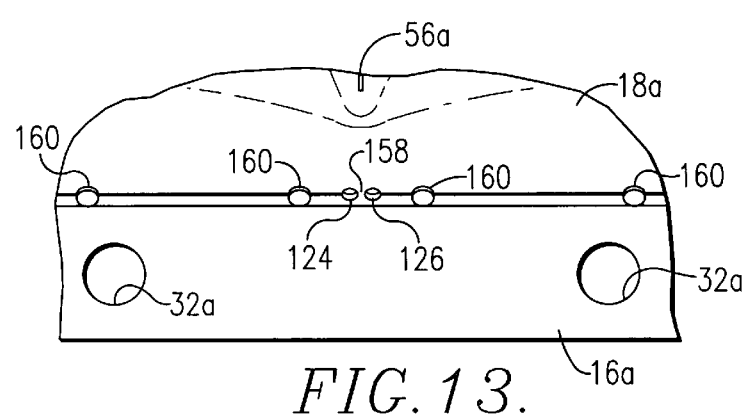

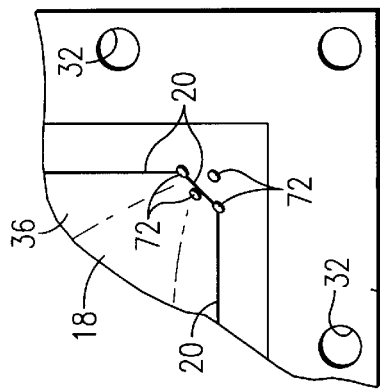
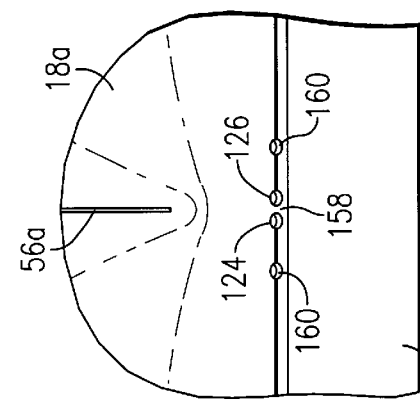
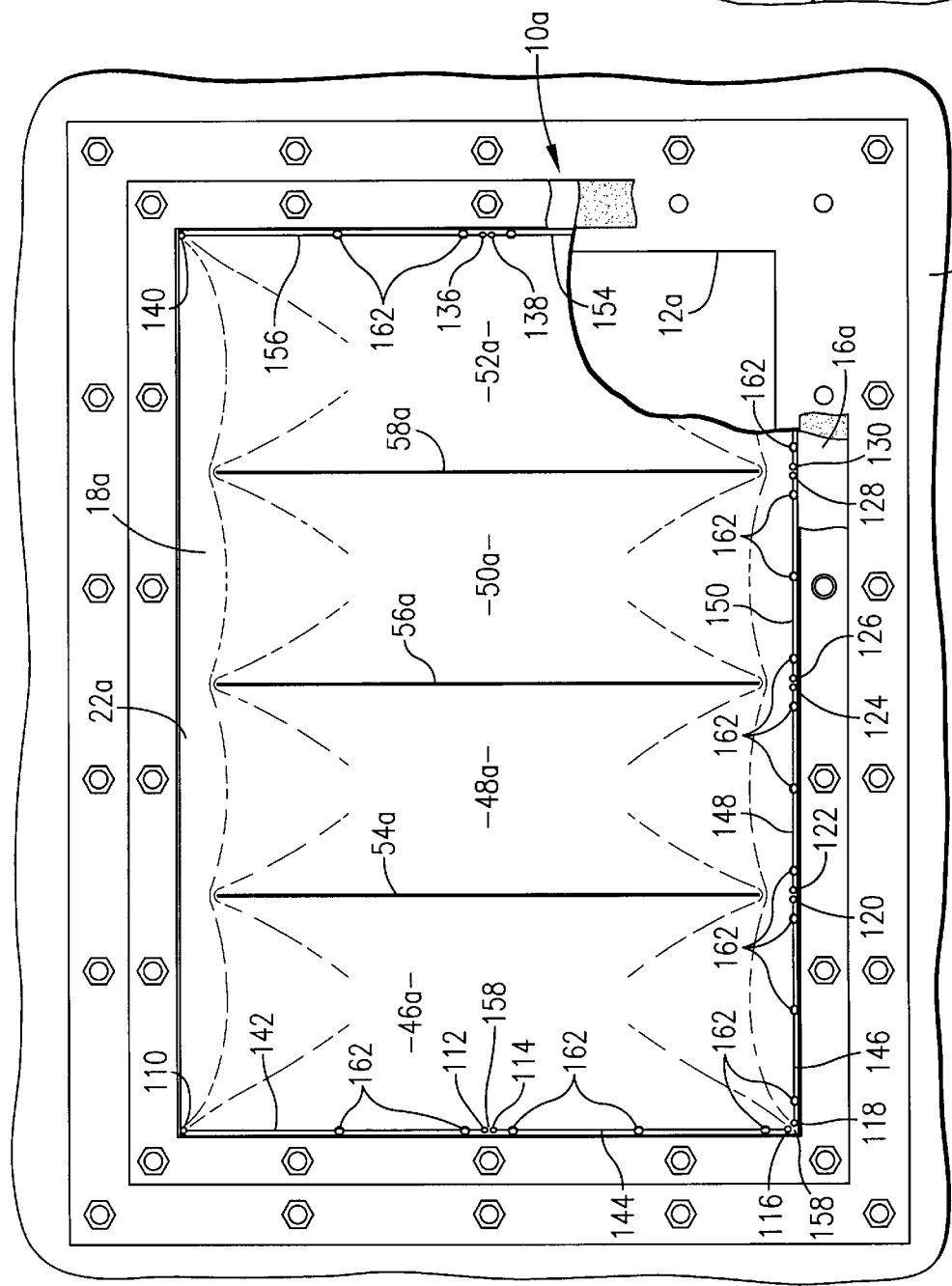

MULTIPLE DOME SINGLE-PANEL EXPLOSION VENT

BACKGROUND OF THE INVENTION

1. Field of the Invention

The present invention relates to explosion vents for covering relief openings in enclosures subject to rapid pressure build-ups such as may occur during explosions or the like in bag houses, the duct work leading to the bag houses, or equipment upstream of the duct work. More particularly, the invention relates to an explosion vent that more consistently bursts or opens when the enclosure to which it is attached is subjected to a pressure build-up of a pre-determined magnitude without prematurely bursting at lower pressure levels or collapsing when the enclosure is subjected to conditions below atmospheric. The explosion vent is uniquely designed and configured to withstand continuous pressure cycling over an extended period of time wherein the individual pressure cycles are each insufficient to cause bursting of the vent.

2. Description of the Prior Art

Explosion vents are commonly used to cover relief openings in enclosures such as bag houses, tanks, etc. for preventing dangerous pressure build-ups within the enclosures. For example, bag houses are constantly at risk of explosions due to the high concentration of dust within the bag houses. Thus, bag houses are typically formed with a plurality of pressure relief openings, and explosion vents are placed over these openings. The explosion vents seal the openings when the bag houses operate at normal pressures and then burst or open when the bag houses are subjected to a pressure build-up of a pre-determined excess magnitude to uncover the openings and to vent the interior of bag houses. To prevent premature or late bursting, explosion vents must be designed to consistently burst at a particular pressure level.

Bag houses are also often subjected to vacuum conditions, particularly during the interval that their filters are being cleaned. Atmospheric pressure externally of the bag house causes an inward force on the explosion vents that tends to collapse the vents. Additionally, bag houses are often cycled between pressure and vacuum conditions, causing the explosion vents to flex back and forth. For example, it is common practice to direct pulses of air against the face of a bag filter which collects dust thereon, to dislodge the particles from the surface of the filter so that the particles thereby fall to a collection area below the filter bags. This cleaning of the surface of the filter bags results in pressure differentials being created within the bag house which result in pressure cycling of the protective vent. During such pressure cycling, the vent panel undergoes in and out movement. Thus, explosion vents must also be configured to withstand or resist vacuum pressures and cycling between pressure and vacuum conditions without collapsing inwardly into the enclosure.

Prior art explosion vents typically included a panel that was slit or formed with lines of weakness to define a rupture portion that ruptured or opened when subjected to a pressure build-up on one side thereof. A plurality of connectors or burst tabs were attached over the slit or lines of weakness to retain the panel in its closed position until subjected to a build-up of pressure of pre-determined magnitude.

Unfortunately, these types of prior art explosion vents frequently opened at pressure levels below or above their rated burst pressure levels because the panels did not uniformly distribute forces across all of the burst tabs, causing some of the burst tabs to break prematurely. Those skilled in the art will appreciate that when one or more of the burst tabs breaks prematurely, the remaining burst tabs are subject to breakage soon thereafter in accordance with a so-called "domino effect". To prevent such premature opening, vents have often been provided with additional burst tabs. However, this frequently caused the panels to open "late", or at pressure levels higher than their rated burst pressures.

It is not uncommon to employ bag house off time cycles which occur as frequently as every six seconds in order to permit cleaning air to be directed against the bag filter. In that instance, the vent panel will be exposed to over five hundred thousand cycles per year. Procedures for effecting cleaning of the filter elements of bag houses are described in detail in an article entitled "Optimize Pulse Jet Dust Collector Performance", published in *Chemical Engineering Progress*, August 1997, pp. 58–61, and in an article entitled "Five Ways to Upgrade your Pulse-Jet Bag House with the Latest Technology", appearing in *Powder and Bulk Engineering*, October, 1997, pp. 61–67. Rapid on and off cycling of bag house filter cleaning processes causes the explosion vents and their burst tabs to flex and bend back and forth, and can result in premature wear and breakage of the burst tabs. This means that the explosion vent for a bag house subjected to pressure cycles of an order of magnitude described must be replaced on a sufficiently frequent basis to avoid premature failure of the lines of weakness defining a rupture portion of the panel, depending upon the number of pressure cycles to which the vent panel is exposed during a defined period.

Another limitation of prior art explosion vents related to limited ability to withstand high vacuum pressures. Often, enclosures such as bag houses are subjected to vacuum pressures that are far in excess of the burst pressures at which the explosion vents are designed to rupture. These high vacuum pressures cause the burst tabs to break or cause the entire panel of the explosion vent to collapse inwardly. Therefore, when prior art explosion vents are used in such applications, they must be either reinforced, which increases their weight and cost, or used in conjunction with a separate vacuum protection panel.

The National Fire Protection Association (NFPA) has issued recommendations regarding weight limitations which in practice suggest that, if ferrous materials are used to fabricate explosion vents, said materials shall not exceed approximately 0.060 in. in thickness. This has imposed a significant limitation on the fabrication of explosion vents which are characterized by significant differential pressure parameters. The greater the pressure vacuum withstand value, then the thicker the vent material must be to meet the stringent differential pressure requirements.

OBJECTS AND SUMMARY OF THE INVENTION

In view of the foregoing, it is an object of the present invention to provide an improved explosion vent that more effectively prevents the build-up of excessive pressure within an enclosure.

It is a more particular object of the present invention to provide an explosion vent that more consistently bursts or opens at a selected pressure level without prematurely bursting at lower pressure levels.

It is another object of the present invention to provide an explosion vent that distributes forces on its burst tabs so that the burst tabs break at a more uniform time relatively when the vent is subjected to a burst or vacuum pressure.

It is another object of the present invention to provide an explosion vent that can withstand vacuum pressures in excess of its rated burst pressures without collapsing.

A further object of the invention is to provide an explosion vent that is less subject to variations in the pressure at which it bursts as a result of temperature variations of the environment in which the vent is operating.

A still further important object of the invention is to provide an explosion vent that is capable of withstanding a significantly higher number of pressure cycles without adversely affecting the burst characteristics of the vent, than has been the case heretofore.

The present invention achieves these objects and other objects that become evident from the description of the preferred embodiments of the invention herein by providing an improved explosion vent for covering an opening in an enclosure such as a bag house. The preferred explosion vent broadly includes a peripheral flange configured for attachment around the opening of the enclosure, a pressure relief panel positioned within and hingedly connected to the flange, and a plurality of connectors or burst tabs forjoining the unhinged portion of the panel to the flange. The pressure relief panel covers and substantially seals the opening when the enclosure is subjected to normal operating pressures. The connectors break or separate, thus allowing the interior panel section of the vent defined by a slit around a portion of the perimeter thereof to open when the enclosure is subjected to a pressure build-up of a pre-determined magnitude for uncovering the opening in the enclosure.

In accordance with the present invention, the pressure relief panel is formed with a plurality of domed sections defining at least one bridge therebetween. The domed sections and bridge stiffen the panel so that it more uniformly distributes force on the connectors when the enclosure is subjected to pressure build-up. This causes all of the connectors to release at a more uniform time relatively so that the panel more consistently opens at a selected burst pressure level. This also reduces the tendency of the panel to prematurely open.

The domed sections also permit the attached connectors to extend in the approximate direction of loading or opening of the panel. This configuration reduces the flexing or bending of the rupture tabs, or the release of connectors joining the central section of the panel to the peripheral flange portion thereof when the enclosure is cycled between pressure and vacuum conditions and thus further reduces the tendency of the panel to prematurely open.

BRIEF DESCRIPTION OF THE DRAWING FIGURES

A preferred embodiment of the present invention is described in detail below with reference to the attached drawing figures, wherein:

FIG. 1 is a plan view of an explosion vent constructed in accordance with a first preferred embodiment of the invention shown attached over an opening in an enclosure and illustrated with parts broken away to more clearly show the attachment of the explosion vent to the enclosure;

FIG. 2 is a fragmentary sectional view of the explosion vent taken substantially along line 2—2 of FIG. 1, and looking in the direction of the arrows;

FIG. 3 is an end elevational view of one end of the explosion vent shown removed from the enclosure;

FIG. 4 is an enlarged fragmentary plan view of the explosion vent illustrating one of the rupture tabs in dashed lines;

FIG. 5 is a section view taken substantially along line 5—5 of FIG. 4, and looking in the direction of the arrows;

FIG. 6 is an enlarged fragmentary rear view of the explosion vent with the rupture tab and support tab therefor removed and illustrating the openings in the vent panel for receiving fasteners that secure a respective rupture tab and support tab to the vent panel;

FIG. 7 is an enlarged fragmentary plan view of the explosion vent illustrating one of the rupture tabs with the support tab therefor removed;

FIG. 8 is an enlarged fragmentary plan view of an explosion vent illustrating one of the rupture tabs with the support tab thereon and held in place with rivet fasteners;

FIG. 9 is an enlarged fragmentary view of the rear face of one corner of the explosion vent, illustrating the slit and the underside of the rivets which fasten the rupture tab and support tab assembly to the vent;

FIG. 11 is a plan view of an explosion vent constructed in accordance with a second preferred embodiment of the invention showed attached over an opening in an enclosure and illustrated with parts broken away to more clearly show the attachment of the explosion vent to the enclosure;

FIG. 12 is an enlarged fragmentary plan view of a part of the panel of the explosion vent, illustrating the line of weakness between adjacent segments of the slit extending around the vent panel, with the rivets presenting connectors between the central panel and the flange portion thereof removed for clarity;

FIG. 13 is an enlarged plan view of the explosion vent of FIG. 12 with the rivet connectors shown attached to the panel and the surround flange portion of the vent;

FIG. 14 is an enlarged fragmentary plan view of the portion of the vent panel illustrated in FIG. 3 and showing further details of the rivet connectors between the interior panel portion and flange portion of the explosion vent;

FIG. 15 is an enlarged fragmentary cross-sectional view taken along line 15—15 of FIG. 14;

Figure 10:
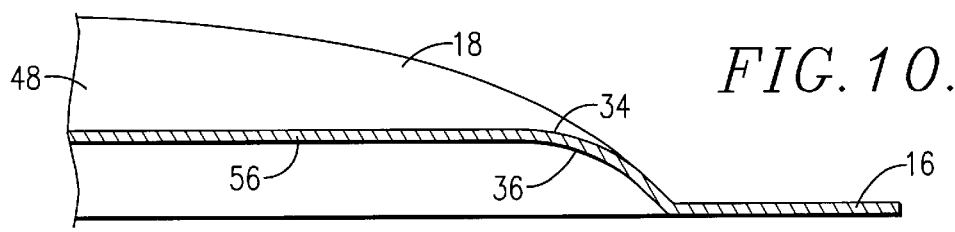
FIG. 10 is an enlarged fragmentary sectional view through one of the valleys between the multiple domes in the central part of the explosion vent panel.
Figure 16:
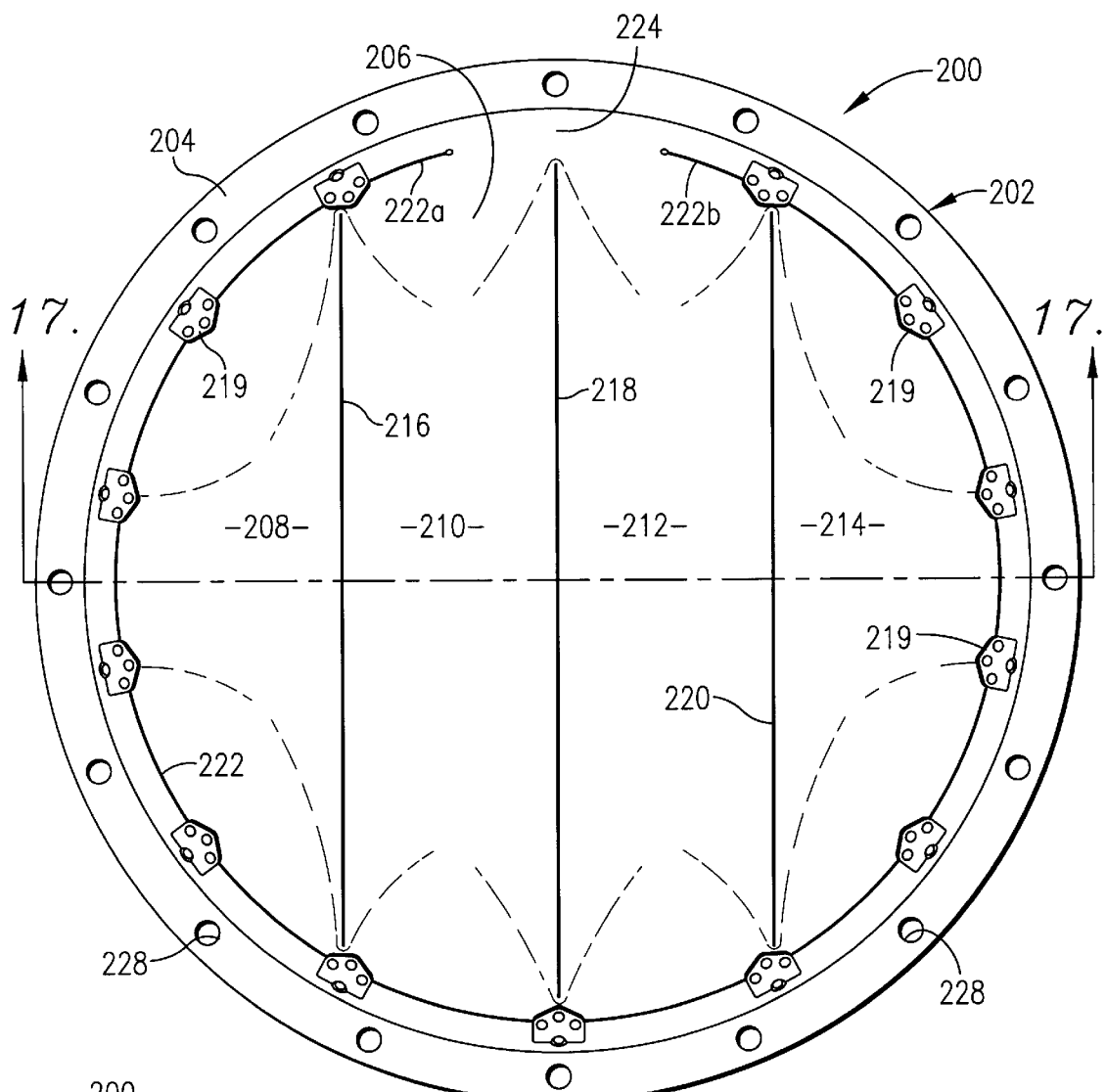
Figure 17:
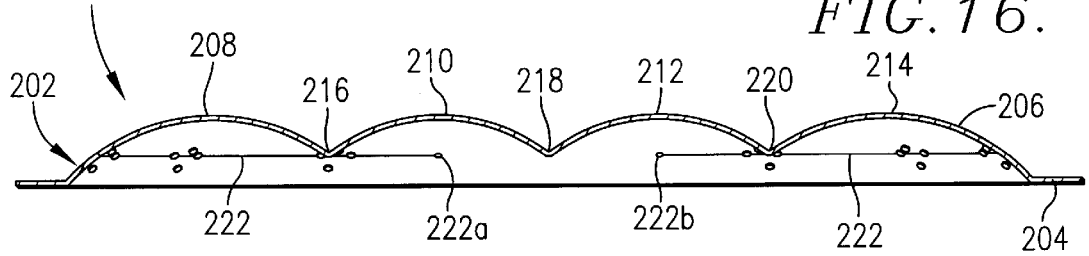

FIG. 16 is a plan view of a third embodiment of the invention which is of overall circular configuration and utilizes rupture tabs and support tabs for connecting the central panel of the explosion vent to the flange portion thereof that are similar to the rupture tabs and support tabs of the first embodiment as shown in FIGS. 1–11 inclusive; and FIG. 17 is a horizontal cross-sectional view taken substantially along the line 17—17 of FIG. 16 and looking the direction of the arrows.

DETAILED DESCRIPTION OF THE PREFERRED EMBODIMENTS

Embodiment of FIGS. 1–10

FIGS. 1–10 illustrate an explosion vent 10 constructed in accordance with a first preferred embodiment of the invention. The explosion vent 10 is configured for attachment over an opening 12 of a bag house, tank, grain silo, or other enclosure 14 that is subject to the extremely rapid build-up of pressures that result from an explosion.

As best illustrated in FIG. 1, the explosion vent 10 broadly includes a peripheral flange 16 or rim configured for attachment in general circumscribing relationship to the opening 12 of the enclosure 14, a pressure relief panel 18 positioned within and hingedly connected to the flange, and a plurality of connectors 19 for connecting the unhinged portions of the panel 18 to the flange 16. The panel is shiftable from a normally closed position depicted in FIG. 1 wherein it substantially seals the opening during the time that the enclosure experiences normal operating pressure conditions, but then shifts and opens when the enclosure is subjected to a buildup of excess pressure that accompanies an event such as an explosion. The connectors normally retain the panel in its closed position and burst or break when the enclosure is subjected to a pressure build-up of a pre-determined magnitude to allow the panel to open.

In more detail, the explosion vent 10 is preferably rectangular in configuration for covering a rectangular opening but may be circular, as depicted in FIGS. 16 and 17, or of any other equivalent shape. The peripheral flange 16 is in the form of a rectangular frame and includes opposed upper and lower sections and opposed left and right sections. Each section includes a plurality of spaced flange holes 32 therethrough for receiving appropriate fasteners such as bolts and associated nuts to releasably secure the explosion vent 10 over the opening 12 of the enclosure 14 as described in more detail below.

The pressure relief panel 18 presents opposed front and rear faces 34,36 (FIG. 2), opposed upper and lower margins 38,40 (FIG. 1), and opposed left and right side margins 42,44. The upper margin of the panel is hingedly connected to the upper section of the peripheral flange 16 by a hinge 22. The panel is shiftable about the hinge between its closed and opened positions as described above. Those skilled in the art will appreciate that the explosion vent may be oriented over the opening 12 in any one of a number of different directions so that the hinge may be positioned adjacent the sides or bottom of the opening.

In preferred forms, the peripheral flange 16 and pressure relief panel 18 are integrally formed from a single sheet of stainless steel, Inconel or other suitable material. Three sides of the panel are cut to form a continuous slit 20 or line of weakness that defines the integral hinge section 22 about which the panel opens or bursts. The peripheral flange and pressure relief panel may also be separately formed and hingedly connected by a hinge or other connector. In one preferred form of the invention, two or more uncut areas are allowed to remain in the panel during formation of the slit 20. These uncut areas are severed during final fabrication of the vent 10 after the connectors 19 have also been suitably secured to the panel 18.

The type and thickness of the material used to fabricate the explosion vent 10 affects the burst rating of the vent and therefore is a matter of design choice. The preferred material is chosen from the group of Series 300 stainless steel, with types 300, 304 or 316 stainless steel being preferred, or an appropriate Inconel alloy. As previously noted, the thickness of the material should not exceed about 0.060 in. and is in fact chosen to meet the requirements of a particular job. In the case of a vent panel that is 12×18 inches, a material thickness of about 0.024 inch has been found to be satisfactory. For panels that are 24×36 or 18×35 inches, the preferred material thickness is 0.036 inch, and for a panel that is 36×44 inches, the preferred material thickness is about 0.050 inch. For example, a pressure relief panel having overall dimensions of 24×36 inches and of a thickness as described, and which is constructed in accordance with the preferred embodiment of FIGS. 1–10 of the invention as described hereinafter, has a vacuum withstand rating of −3 psig and a burst pressure rating of 1.110 psi. In addition, the panel was found to withstand in excess of 1,000,000 pressure cycles without failure of the vent.

In accordance with the present invention, the pressure relief panel is formed with a plurality of outwardly extending and elongated domed sections 46,48,50,52 that are defined by a plurality of connecting bridges 54,56,58 therebetween. As illustrated in FIG. 2, the height "x" of the domed sections of a panel that is 18×24 inches and measured from the peripheral flange is approximately 1.3 inches. In larger relief panels, each dome normally does not exceed about 1.5 inches in height. In preferred forms, the explosion vent includes four domed sections and three interconnecting bridges; however, any number of domed sections may be provided. The domes are nominally from about 4½ to about 6 inches in width (valley to valley dimension) regardless of the overall size of the explosion vent.

The domed sections 46,48,50,52, bridges 54,56,58 stiffen and add rigidity to the panel so that the panel opens in an even and uniform manner. The stiffness and rigidity of the panel causes it to exert a uniform force on the connectors 19 when the enclosure is subjected to a pressure build-up. This prevents some of the connectors from prematurely breaking as a result of a "domino effect" and insures that the panel consistently opens at a selected burst pressure rating and pressure as described in more detail below.

In preferred forms, the domed sections 46,48,50,52, and the bridges 54,56,58 extend generally transversely from the hinge 22. The bridges are the most rigid portion of the panel; therefore, this orientation further strengthens and stiffens the panel and prevents the panel from flexing or bending while opening.

The slit 20 is preferably formed slightly inside the perimeter of the domed sections 46,48,50,52 so that it is spaced slightly above the flange as illustrated in FIG. 2. Thus, the slit is spaced a short distance from the wall of the enclosure and is positioned on the angled portion of the pressure relief panel 18. In the fabrication of the relief portion of the panel 18, it is preferred that the domed sections 46,48,50,52 be formed first, and the slits 20 thereafter be cut in the material using suitable tooling for that purpose. For instance, the domed sections 46,48,50,52 may be formed by providing appropriate number of parallel metal plates across a rectangular opening receiving the panel to be formed, whereupon pressurized fluid is exerted against the face of the panel opposed to the forming plates to cause the bulges or domed sections to be formed in the metal. A forming pressure of 300–400 psi has been found to be suitable for doming of the panel.

The connectors 19, which are preferably in the form of a burst tab assembly as illustrated are attached over the slit 20 between the pressure relief panel 18 and the flange 16. The preferred connectors include a generally irregularly-shaped piece of thin-gauge material as best shown in FIGS. 4 and 7 of the drawings. It can be seen from these figures that each of the connectors 19 is made up of a rupture tab 21 having a main, essentially triangular body section 23 integrally connected to a generally circular, smaller breakaway section 25 joined by a connector filament section 27. The thin filament sections 27 are designed to break when the explosion vent is subjected to a pressure build-up of a predetermined magnitude to permit the pressure relief panel to open or burst as described below.

The type of material and thickness of the material used to form the burst tabs 21 affects the burst rating of the explosion vent 10 and therefore is generally a matter of design choice. The preferred burst tabs 21 are formed from Inconel, although 300 Series stainless steel, i.e., 300, 304 or 316, may be employed. Inconel is preferred because that alloy has a greater burst pressure stability over a wider temperature range. The thickness of the rupture tabs 21 may vary from about 0.010 to about 0.030 inch, with 0.010 being the preferred thickness. In addition, the width of each of the filament sections 27 is varied depending upon the overall dimensions of the vent panel. The width of the filament 27 is normally within the range of about 0.040 to about 0.1 inch. In the case of the illustrative vent panel that is 18×24 inches as described above, a rupture tab 21 having a thickness of 0.010 inch preferably is provided with a filament 27 width dimension of about 0.040 inch. The cross-sectional dimension of each filament 27 is chosen to obtain the desired burst characteristics of the panel.

A trapezoidal-shaped support tab 29 (FIG. 8) is provided in overlying relationship to each of the generally triangular body sections 23 of each of the rupture tabs 21. Again the support tabs 29 are preferably fabricated of Inconel, or of Series 300 stainless steel as alluded to above, with the thickness thereof again varying from about 0.018 to about 0.048 inch depending upon the overall dimensions of the panel.

As best illustrated in FIGS. 4 and 7, each rupture tab 19 is preferably connected to the pressure relief panel 18 over the slit 20 by a plurality of rivets 72. The rivets are inserted through three rivet holes 74 formed in triangular body section 23 of a respective rupture tab 21 and corresponding aligned rivet holes 76 formed in the panel. Two of the panel rivet holes 76 are preferably formed over the slit 20 and two additional rivet holes are formed on opposite sides of the slit as best illustrated in FIGS. 4 and 6. A fourth rivet hole 74 is formed in the secondary, circular portion 25 of each rupture tab 21 in spaced relationship from the adjacent segment of slit 20, so that though a small portion of the body section 23 is on the same side of the slit as the circular portion 25, the circular portion 25 is generally on an opposite side of the slit 20 from the body section 23. The holes 76 each receive a corresponding rivet 72. It is to be observed from FIGS. 4 and 7 that the triangular section 23 of each rupture tab 21 is positioned in spanning relationship to slit 20, while the circular tab portion 25 is located in proximal relationship to the flange portion 16 of the panel.

As illustrated in FIG. 5, each rivet 72 includes a shank 78 and a relatively larger diameter head 80. The rivets are inserted through the burst tab holes 74 and the panel holes 76 from the exterior face of the panel. This disposition of the rivets is not critical and the location of the head portion thereof may be reversed if desired, so that the rivet heads are positioned along the interior face of the panel. The rivets provide vacuum support for the panel without affecting the burst pressure rating of the panel as described in more detail below.

When attached to the panel, the burst tabs 19 extend outwardly from the wall of the enclosure 14 at an angle greater than 45° measured from the flange 16 as best illustrated in FIG. 2. This orients the burst tabs in nearly the same direction of the bursting or loading of the panel. Although an angularity of 45° is preferred, satisfactory results may be obtained in accordance with the present invention at other equivalent angles.

Advantageously, the burst tabs 19 and rivets 72 may be attached to the panel 18 immediately before the explosion vent is installed on an enclosure to customize the vent 10. This permits a large quantity of vents to be manufactured and then stored until ready for use. Once a vent is ready for installation, a particular number of burst tabs and rivets having a desired burst pressure and vacuum withstand rating can be attached over the slit 20 of the panel to provide the desired burst pressure rating for a specific application of the vent. This permits the explosion vent 10 to be economically manufactured in larger quantities and then customized for particular applications when installed.

In addition, an elastomeric seal 73 is preferably provided over the underside 36 of the panel 18 in sealing relationship to the slit 20, and also in overlying relationship to the underside of the rivets 72 securing a respective connector 19 to the panel. Advantageously, the elastomeric seal 73 is formed by spraying a silicone composition on to the under face of the panel across slit 20 throughout the longitudinal extent thereof. A preferred sealing agent is an iron oxide based silicone mixed with sufficient naphtha to permit spraying thereof onto the surface of the panel. The thickness of the spray coating may be varied but nominally is about 0.020 inch. Alternatively, a seal coating may also be applied to the upper surface of the vent panel across slit 20 in alignment with the sealing agent on the under face of the panel. As a further alternate embodiment, the elastomeric coating agent may be a preformed member which is adhesively secured to the bottom surface of the panel and/or the top surface thereof across the slit 20 as described, with the preferred sealing agent again being a strip of silicone containing iron oxide as an additive.

INSTALLATION AND OPERATION

The installation of the explosion vent 10 over the opening 12 in an enclosure 14 is best illustrated in FIGS. 1 and 2. The wall of the enclosure adjacent the periphery of the opening should desirably first be equipped with a plurality of outwardly extending and threaded studs 82. A metal mounting frame 84 having a plurality of spaced holes 86 therethrough is placed over the studs and secured to the enclosure wall by a plurality of threaded nuts 88 screwed on the studs. The frame also includes a plurality of spaced, outwardly extending threaded studs 90 inboard of the holes 86.

The explosion vent 10 is then secured to the mounting frame 84 by positioning the flange holes 32 over the mounting frame studs 90. A rectangular frame-shaped clamp 92 having a plurality of holes 94 aligned with the flange holes 32 is then placed over the mounting frame studs 90 so that it covers the flange 16. The clamp and flange are then securely fastened to the frame by a plurality of nuts 96 screwed on the mounting frame studs 90. A gasket 98 may be placed between the enclosure wall and the mounting frame 84 and a gasket 100 may be placed between the mounting frame and the flange 16 as illustrated in FIG. 2 to seal the explosion vent 10 over the opening.

When the explosion vent 10 is installed, the pressure relief panel 18 covers and substantially seals the opening 12 in the enclosure 14. As long as the enclosure is subjected to normal operating pressures, the pressure relief panel remains in this closed position.

When the enclosure 14 is subjected to a build-up of pressure, the pressure exerts an outward force on the rear or interior face 36 of the pressure relief panel 18. The panel in turn transfers this force to the burst tabs 21. Once the pressure builds up to a pre-determined magnitude, the thin filaments 27 of the rupture tabs break so that the circular secondary sections 25 of the tabs separate from their corresponding triangular main body 23. This permits the pressure relief panel to shift outwardly away from the enclosure for uncovering the opening to vent the pressure out of the enclosure, thus preventing or minimizing any damage to the enclosure. After the burst tab filaments 27 break, the panel opens at a controlled rate.

It is to be observed from FIGS. 1, 7, and 8 that in order for the hinged panel 18 of vent 10 to move outwardly relatively to the flange portion 16 thereof, the rivets 72 spanning slit 20 must release from opposed edges of the panel defining slit 20, and the filament portions 27 of each rupture tab 21 must rupture. It is this combination of release of the rivets 72 and rupture of respective filaments 27 that controls the burst pressure of the vent 10, while at the same time providing required resistance to rupture under the vacuum conditions which the vent is subjected during use. By virtue of the fact that the triangular portions 23 of each of the rupture tabs 21 is located in bridging relationship to slit 20 and the location of the rivets 72 securing each of the triangular portions 23 of rupture tabs 21, the entire assembly is resistant to untoward rupture and opening of panel 18 during pressure cycle variations that are of values less than the pressure required to effect opening of panel 18 to vent the interior of a bag house or the like. It can be seen from FIG. 4 for example that the filament portion 27 of each rupture tab 21 is spaced from a respective segment of the slit 20, and thus during intermittent pressure cycles that occur during pulsed cleaning of the bag filters do not exert untoward bending or stress forces on filament portions 27 of the rupture tab assemblies 21. As a result, the useful life of the vent 10 is not decreased as a consequence of a succession of forces being applied to the filament portions 27 of rupture tab assemblies 21 that would unduly shorten the life of the explosion vent 10. The provision of support tabs 29 in overlying relationship to the triangular portions 23 as well as the filament portions 27 of each of the rupture tab assemblies 21 (see FIG. 8) reinforces the filament portions 27 and minimizes the bending and stress forces that would otherwise be applied to the filaments 27 during intermittent cycling of the pressure conditions to which the explosion vent 10 is subjected during cleaning of the bag filters.

Advantageously, the domed sections 46,48,50,52 and bridges 54,56,58 stiffen the panel to an extent that forces are more uniformly distributed to all of the burst tabs 19 when the enclosure 14 is subjected to rapid pressure build-up. This causes all of the burst tab assemblies 21 to rupture at essentially the same time so that the pressure relief panel 18 more consistently opens at a selected burst pressure level. This also prevents the burst tabs from breaking in accordance with a "domino effect" described above.

Additionally, since the burst tab assemblies 21 extend in the approximate direction of loading or opening of the panel 18, and because the vacuum support rivets 72 cause the panel 18 and tab assemblies 21 to move as essentially a unit, the burst tabs are not subjected to localized bending and flexure as explained above when the enclosure is cycled between pressure and vacuum conditions. This prevents the burst tabs from prematurely breaking from metal fatigue and further reduces the tendency of the panel to prematurely open. When the panel 18 opens in the forward direction, the panel can readily slip out of the shank portions of the rivets 72, and thus the only resistance to opening of the panel 18 is the series of filament portions 27 of corresponding rupture tab assemblies 21.

However, under vacuum conditions, the orientation of the rupture tab assemblies 21 with respect to the dome sections 46,48,50,52 of the panel 18 provides vacuum support for the panel 18 without affecting the burst rating of the explosion vent 10. Furthermore, when the panel 18 is forced against the rivets, the heads of the rivets engage the inner edge of panel 18 defined by slit 20. Significant resistance is thus offered by the rivets, thereby increasing the ability of the vacuum panel to withstand a significant vacuum. The rivet heads allow the explosion vent to be used with vessels that are subjected to vacuum pressure such as bag houses without reinforcing the panel or without using a separate vacuum resist panel.

It has been determined that an explosion vent 10 constructed in accordance with the embodiment of the invention described in detail above may be fabricated to operate and open at a large range of differential pressures relative to atmospheric pressure. As an example only, explosion vents may be constructed in accordance with the concepts hereof to operate and open at a differential pressure of from about 0.5 to about 5 psi in the case of a vent having overall dimensions of about 44 in. by 69 in., from about 1.5 to about 5 psi differential pressure in the instance of a typical vent having dimensions of about 18 in. by 35 in., and a differential pressure of about 1.5 to about 5 psi with respect to smaller vents which measure about 9 in. by about 12 in.

Embodiments of FIGS. 11–15

FIGS. 11–15 illustrate an explosion vent 10a constructed in accordance with a second preferred embodiment of the invention. The explosion vent 10a is nearly identical to the explosion vent 10 of the first embodiment of the invention; therefore, components of the explosion vent 10a that are similar to the components of vent 10 are identified by the same numerals followed by an "a".

As best illustrated in FIG. 8, the explosion vent 10a broadly includes a peripheral flange 16a or rim configured for attachment around the opening 12a of an enclosure 14a and a pressure relief panel 18a positioned within and hingedly connected to the flange. The pressure relief panel includes a plurality of domed sections 46a,48a,50a,52a and interconnecting bridges 56a,58a identical to the ones described above.

The peripheral flange 16a and pressure relief panel 18a are preferably integrally formed from a single sheet of stainless steel or other suitable metal that is cut or slit to define a hinge 22a along the upper margin of the panel about which the panel opens or bursts. However, unlike the vent 10 of the first embodiment of the invention, the explosion vent 10a is cut to form a plurality of integral connectors or filaments 158 that replace the burst tabs 19 of the first embodiment of the invention.

Specifically, a hole 110 is cut through the upper left corner of the panel, a pair of adjacent holes 112,114 are cut through the mid-point of the left side margin of the panel, a pair of adjacent holes 116,118 are cut through the lower left corner of the panel, pairs of adjacent holes 120,122; 124,126; and 128,130 are cut through the lower margin of the panel directly below the bridges 54a,56a,58a, a pair of adjacent holes (not shown) are cut through the lower right corner of the panel, a pair of adjacent holes 136,138 are cut through the mid-point of the right side margin of the panel, and a hole 140 is cut through the upper right corner of the panel. The additional holes 160 shown between holes 110–140 are rivet holes described below.

A slit 142 is cut between holes 110 and 112, a slit 144 is cut between holes 114 and 116, a slit 146 is cut between holes 118 and 120, a slit 148 is cut between holes 122 and 124, a slit 150 is cut between holes 126 and 128, a slit (not shown) is cut between holes 130 and 132, a slit 154 is cut between holes 134 and 136, and a slit 156 is cut between holes 138 and 140. The slits 142, 144, 146, 148, 150, 152, 154, 156 partially separate the unhinged portion of the pressure relief panel 18a from the peripheral flange 16a. However, the regions between the pairs of adjacent holes 112,114; 116,118; 120,122; 124,126; and 128,130 are not cut. The uncut regions define a plurality of thin filaments 158 spaced along the unhinged periphery of the panel 18a that serve as integral connectors.

These filaments 158 serve the same function as the burst tabs 19 described above. Specifically, when the enclosure is subjected to a build-up of pressure, the pressure exerts a force on the inside face of the pressure relief panel 18a. The panel in turn transfers this force to the filaments. Once the pressure builds up to a pre-determined magnitude, the thin filaments break. This permits the pressure relief panel to shift outwardly away from the enclosure for uncovering the opening to vent the build-up of pressure out of the enclosure, thus preventing or minimizing damage to the enclosure.

A plurality of spaced rivet holes 160 are also cut through the panel 18a along the length of the slits 142, 144, 146, 148, 150, 152, 154, 156. Rivets 162 are inserted through these holes from the inside face of the panel so that the rivet heads 164 are positioned on the inside face of the pressure relief panel as best illustrated in FIGS. 14 and 15.

The rivets 162 provide vacuum pressure support or resistance for the panel. Specifically, when the enclosure is subjected to vacuum pressure, the pressure relief panel 18a is subjected to an inward force that attempts to collapse the panel. The rivets 162 support the panel and prevent the panel from collapsing inwardly towards the enclosure. However, the shank or front portions of the rivets provide no resistance to the forward bursting of the panel. Thus, the rivet heads allow the explosion vent to be used with vessels that are subjected to vacuum pressure such as bag houses without reinforcing the panel or without using a separate vacuum resist panel.

The explosion vent 10a is installed in the same manner as the explosion vent 10 described above.

Embodiment of FIGS. 16–17

The explosion vent 200 as illustrated in FIGS. 16 and 17 differs from the previously described embodiment as shown in FIGS. 1–10 primarily in the overall configuration thereof. As can be seen from these essentially schematic depictions, the vent 200 includes a circular panel 202 having an annular peripheral flange portion 204 which is integrally joined to the central circular segment 206 thereof. The central segment 206 of panel 202 is provided with a series of elongated, parallel domed sections 208,210,212 and 214 which are joined by respective elongated, rectilinear bridges 216,218 and 220, respectively. The domed sections 208–214 and associated valley defining bridges 216–220 are of essentially the same configuration as the domed sections 46,48,50,52, and bridges 54,56,58 described above. The domed sections 208,210,212,214 and associated bridges 216,218,220 are preferably oriented such that bridges 216–220 are in generally perpendicular relationship to the longitudinal length of hinge portion 224.

In the embodiment illustrated in FIG. 17, the peripheral portion of panel 202 is provided with an arcuate slit 222 having end segments 222a and 222b which terminate in spaced relationship from one another. The adjacent ends 222a and 222b are spaced apart a sufficient distance from one another to define a hinge portion 224 for the central segment 206 of panel 202.

A series of holes 228 are provided in the flange portion 204 of vent 200 to facilitate attachment of the vent to a circular opening therefor provided in the wall of the facility to be protected. Upon occurrence of an explosion or other high pressure event within the interior of the protected enclosure, the filaments 226 all rupture substantially at the same time allowing the central portion of the panel 202 to move outwardly as such central portion swings about hinge portion 206.

Rupture tab assemblies 219 identical with rupture tab assemblies 21 as depicted in FIGS. 1–10 hereof, and described in detail with respect to the first preferred embodiment of the invention, are provided around the perimeter of slit 222 as shown in FIG. 16. The rupture tab assemblies 219 are mounted on the circular panel of explosion vent 200 in the same manner as described with respect to rupture disc assemblies 21 and the assemblies 219 function in a manner exactly the same as described in detail with reference to assemblies 19.

It is to be understood that the rupture tab assemblies 19 and the rupture tab assemblies 219 respectively may be mounted on the under surface of the panel 18 or 200, as the case may be, in bridging relationship to a respective slit 20 or 220, and similar results obtained so long as the parts are fabricated of dimensions to give results equivalent to those previously described in detail above.

Although the invention has been described with reference to the preferred embodiment illustrated in the attached drawing figures, it is noted that equivalents may be employed and substitutions made herein without departing from the scope of the invention as recited in the claims.

Having thus described the preferred embodiment of the invention, what is claimed as new and desired to be protected by letters patent includes the following:

We claim:

1. An explosion vent for covering an opening in an enclosure, said explosion vent comprising:

a peripheral flange configured for attachment to the enclosure around the opening;

a pressure relief panel positioned within and hingedly connected to said flange for covering and substantially sealing the opening when the enclosure is subjected to normal operating pressures and for shifting outwardly from the enclosure for at least partially uncovering the opening when the enclosure is subjected to a build-up of pressure of a pre-determined magnitude; and a plurality of connectors for connecting said panel to said flange and configured for breaking when the enclosure is subjected to the pre-determined magnitude of pressure build-up for permitting said panel to shift outwardly from the enclosure for uncovering the opening in the enclosure;

said pressure relief panel having a plurality of domed sections defining at least one bridge therebetween for stiffening said panel for more uniformly distributing force on said connectors when the enclosure is subjected to the pre-determined magnitude of pressure build-up.

2. The explosion vent as set forth in claim 1, wherein said peripheral flange and said pressure relief panel are integrally formed from a single sheet of metal and partially separated by at least one slit defining a hinge between said panel and said flange for hingedly connecting said panel to said flange.

3. The explosion vent as set forth in claim 2, wherein said bridge extends generally perpendicularly to said hinge.

4. The explosion vent as set forth in claim 2, wherein said connectors consist of unslit portions of said single sheet of metal that define filaments connecting said peripheral flange to said pressure relief panel.

5. The explosion vent as set forth in claim 2, wherein said connectors consist of rupture tabs configured for attachment to said panel over said slit.

6. The explosion vent as set forth in claim 5, said pressure relief panel having an interior face in communication with the interior of the enclosure and an exterior face in communication with the exterior of the enclosure, wherein said rupture tabs are configured for attachment over said slit along the exterior face of said panel.

7. The explosion vent as set forth in claim 2, further including a plurality of vacuum pressure supports positioned over said slit for preventing the panel from shifting inwardly into the enclosure when the enclosure is subjected to a vacuum pressure.

8. The explosion vent as set forth in claim 5, said vacuum pressure supports comprising a plurality of rivets inserted through said panel and positioned over said slit for preventing the panel from shifting inwardly into the enclosure when the enclosure is subjected to a vacuum and for reducing localized bending of the rupture tab.

9. The explosion vent as set forth in claim 8, wherein said rivets attach said rupture tabs to said panel and said flange.

10. The explosion vent as set forth in claim 2, wherein each of said connectors includes a rupture tab having a main body portion, a secondary body portion spaced therefrom, and a filament portion joining the main body portion to the secondary body portion, said main body portion being secured to the panel in bridging relationship to said slit, and said secondary body portion being secured to the panel in spaced relationship from the slit, said filament portion being configured in the range to break upon bursting of the vent causing the pressure panel portion thereof to shift outwardly from the enclosure for uncovering the opening and enclosure.

11. The explosion vent as set forth in claim 10, said explosion vent being provided with a support tab in overlying relationship to the main body portion and the filament portion of each rupture tab for reinforcing the filament portion against localized bending and stress forces during pressure cycling of the explosion vent.

12. The explosion vent as set forth in claim 1, said pressure relief panel being of generally circular configuration, with said bridge extending generally perpendicular to a hinge between said pressure relief panel and said peripheral flange.

13. An explosion vent for covering an opening in an enclosure for venting pressure build-up within the enclosure, said explosion vent comprising:
    a sheet of metal having at least one slit therein that defines
        a peripheral flange configured for attachment to the enclosure around the opening,
        a pressure relief panel positioned within the flange for covering and substantially sealing the opening when the enclosure is subjected to normal operating pressures and for shifting away from the opening for exposing the opening when the enclosure is subjected to a build-up of pressure of a pre-determined magnitude; and
        a hinge for hingedly connecting said panel to said flange;
    a plurality of connectors for connecting said panel to said flange and configured for breaking when the enclosure is subjected to the pre-determined magnitude of pressure build-up;
    said pressure relief panel having a plurality of domed sections defining at least one bridge therebetween for stiffening said panel for more uniformly breaking said connectors when the enclosure is subjected to the predetermined magnitude of pressure build-up; and
    a plurality of vacuum pressure supports positioned over said slit for preventing the panel from shifting inwardly into the enclosure when the enclosure is subjected to a vacuum pressure.

14. The explosion vent as set forth in claim 13, wherein said bridge extends generally perpendicularly to said hinge.

15. The explosion vent as set forth in claim 13, wherein said connectors consist of unslit portions of said single sheet of metal that define filaments connecting said peripheral flange to said pressure relief panel.

16. The explosion vent as set forth in claim 13, wherein said connectors consist of rupture tabs configured for attachment to said panel over said slit.

17. The explosion vent as set forth in claim 13, said vacuum pressure supports comprising a plurality of rivets inserted through said panel and positioned over said slit for preventing the panel from shifting inwardly into the enclosure when the enclosure is subjected to a vacuum pressure.

18. The explosion vent as set forth in claim 17, said pressure relief panel having an interior face in communication with the interior of the enclosure, wherein said rivets each include a rivet head, wherein said rivets are inserted through said panel so that said rivet heads are positioned on the interior face of the panel.

19. The explosion vent as set forth in claim 17, said pressure relief panel having an interior face in communication with the interior of the enclosure, wherein said rivets each include a rivet head, wherein said rivets are inserted through said panel so that said rivet heads are positioned on an exterior face of the panel.

20. The explosion vent as set forth in claim 19, wherein said rivets attach said connectors to said panel and said flange.

21. The explosion vent as set forth in claim 13, said pressure relief panel having four domed sections separated by three bridges.

22. The explosion vent as set forth in claim 13, said pressure relief panel being of generally circular configuration, with said bridge extending generally perpendicular to said hinge.

23. A rupture tab assembly for use with an explosion vent having a pressure relief panel surrounded by a peripheral flange with a slit partially separating the relief panel from the peripheral flange, the rupture tab assembly including:
    a body section for connection to at least one of the relief panel and the peripheral flange;
    a breakaway section for connection to at least one of the relief panel and the peripheral flange and being generally on an opposite side of the slit from the body section; and
    a narrow connector filament joining the body section to the breakaway section and being designed to break when the explosion vent is subjected to a pressure buildup of predetermined magnitude.

24. The rupture tab assembly as set forth in claim 23, wherein:
    the body section comprises a generally triangular body for connection to the relief panel,
    the breakaway section comprises a circular breakaway section for connection to the peripheral flange,
    the body section, breakaway section, and connector filament are integrally formed, and
    the connector filament comprises a width in the range of approximately $4 \times 10^{-2}$ in. to approximately $1 \times 10^{-1}$ in.

25. The rupture tab assembly as set forth in claim 23, further comprising a trapezoidal shaped support tab for connection to and over the body section.

26. The rupture tab assembly as set forth in claim 23, wherein the body section comprises a plurality of fastener holes for receiving fasteners for connection of the body section to the explosion vent, and at least one hole being positioned over the slit of the explosion vent.

27. The rupture tab assembly as set forth in claim 26, wherein two fastener holes are located over the slit in the explosion vent and another fastener hole is spaced apart from the slit.

28. The rupture tab assembly as set forth in claim 23, wherein the body section is connected to the relief panel and the slit, and the breakaway section is connected to the peripheral flange.

29. The rupture tab assembly as set forth in claim 23, wherein the body section, the breakaway section, and the connector filament are oriented in a direction nearly the same as a bursting direction of the relief panel.

* * * * *